United States Patent Office 3,165,413
Patented Jan. 12, 1965

3,165,413
PREVENTION OF GEL FORMATION
George R. Weber and Franklyn D. Miller, Cincinnati, Ohio, assignors to National Distillers and Chemical Corporation, New York, N.Y., a corporation of Virginia
No Drawing. Filed Jan. 23, 1962, Ser. No. 168,274
17 Claims. (Cl. 99—6)

This invention relates to improvements in liquid animal feed supplements. More particularly, this invention relates to the stabilization of liquid animal feed supplements which contain mixtures of molasses and phosphoric acid or phosphates.

Various liquid feed supplements for animals, particularly ruminants such as cattle, sheep, camels, goats, bison, and others, include phosphoric acid, or an equivalent soluble phosphate and a molasses. For example, Anderson et al. in U.S. 2,748,001 describes a liquid feed supplement having a major portion of molasses, and lesser portions of urea, water, and phosphoric acid or soluble phosphates. In later patents of Anderson et al., vitamins (U.S. 2,807,546) and ethanol (U.S. 2,808,332) are included in the liquid feed supplement. Other liquid feed supplements include only phosphoric acid and molasses, such as discussed, for example, in the article entitled "Phosphoric Acid and Molasses" by G. E. Sanko appearing in the December 1960 issue of Western Feed and Seed.

In using the above-mentioned types of liquid feed supplements, it is the general practice for a feed distributor or molasses supplier to mix the molasses with the phosphoric acid and any desired soluble ingredients and store the mixture in tanks until required by the feeder. When a feeder desires the supplement for direct feeding in liquid form, the distributor transfers the mixture by means of tank trucks to smaller storage tanks located at the feeding site from which the liquid feed supplement is dispensed as required. In other instances, the feed supplement may be incorporated into pellets formed from feeds such as alfalfa, barley, cottonseed, and the like, and sold to the user in this form.

By either method of use, a critical requirement of the feed supplement is that it remain fluid in storage, at the distribution site and particularly at the site of use when fed in liquid form, in order to permit pumping and dispensing. In practice, however, it has been found that the use of certain types of molasses result in gelation of the phosphoric acid-molasses mixtures to non-fluid masses at unpredictable periods following the mixing step. Occurrence of this phenomenon is most prevalent, and most severe, in the smaller liquid storage units located at the feeding site, presumably because of the wide temperature fluctuations to which these smaller storage units are exposed. Obviously, the occurrence of gelation during storage is costly in terms of added material and material handling costs as well as in customer confidence and satisfaction.

Accordingly, it is one object of this invention to stabilize liquid animal feed supplements containing phosphoric acid and molasses against gelling in storage.

It is another object of this invention to stabilize liquid animal feed supplements containing phosphoric acid and molasses against gelling in storage by a method which is not detrimental to the palatability or nutritional function of the supplements.

It is a further object of this invention to stabilize liquid animal feed supplements containing phosphoric acid and molasses against gelling in storage by a method which is readily compatible with existing equipment and handling techniques.

A still further object of this invention is the preparation of liquid animal feed supplements containing phosphoric acid and molasses which are stable to gelling during storage wherein the molasses used normally has a high gelling tendency.

These and other objects are accomplished by a process wherein a small amount of a non-phosphatic acid is incorporated into the liquid feed supplement containing phosphoric acid and molasses.

An examination was made of various types of molasses commonly used in animal feeds in regards to gelling tendency when contacted with a phosphatic material, i.e., phosphoric acid or a soluble phosphate. It was discovered that gelling occurred most frequently in marginal or inferior grades of molasses, such as, for example, molasses produced from cane juice which had been allowed to become excessively acid prior to the sugar extraction process. Such molasses generally contain excessive amounts of calcium introduced as lime to neutralize the excess acidity. Analysis of a gel produced from a mixture of molasses and phosphoric acid indicated that such gels are probably insoluble complexes of calcium, polysaccharide gums, and a phosphatic anion. It was further discovered that where a molasses contains gelling constituents, the tendency to gel in the presence of phosphoric acid increases rapidly both with increases in the pH and the temperature of the mixture. However, it was found that it is not possible to predict the gelling tendencies of a molasses merely from its pH or to prevent such tendencies by adjusting the pH of mixtures of molasses and phosphoric acid to a particular range by varying the ratio of phosphoric acid to molasses. For example, when equal weights of a feed blackstrap molasses secured from an Eastern United States supplier and a molasses secured from a Southern United States supplier, each having a pH of 5.4, were mixed with sufficient phosphate solution of pH of 2.7 to reduce the pH of the mixtures to 4.7, and the two mixtures stored side by side at 42° C., the first mixture gelled solid within 2 hours whereas the second remained fluid for longer than 16 days with no indication of gelling.

To measure the relative tendencies of various molasses to gel and the effects on such tendencies produced by use of the hereindescribed invention, a standard and realistic test for gelling was devised. An aqueous phosphatic gelling test solution with a pH of 2.7 was prepared containing 80.56 grams of monobasic sodium phosphate, $NaH_2PO_4 \cdot H_2O$, and 11.90 grams of 85 percent orthophosphoric acid per liter of solution. In the standard procedure, one part by weight of this test solution was blended uniformly with two parts by weight of the molasses, the blend placed in a stoppered cylinder or vial, and the vial placed in a water bath or incubator regulated to 108° F. (42° C.). The vial was examined periodically and the extent of gelling noted. Depending upon the molasses used, the start of gel formation was observed in as little as three minutes to as long as 90 days or more. The following table shows the test results recorded for a series of commercial samples of feed grade molasses:

| Molasses | | | Blend with Phosphatic Test Solution | |
|---|---|---|---|---|
| Type | Source of Sample | pH | pH | Gelling Time |
| Mexican cane | Pennsylvania | 4.98 | 4.48 | <2.0 hr. |
| Do | Maryland | 5.09 | 4.54 | <1.5 hr. |
| Do | Texas | 5.56 | 4.94 | <1.5 hr. |
| Blackstrap | New York | 5.40 | 4.69 | <2.0 hr. |
| Do | Kentucky | 5.35 | 4.74 | >16 days. |
| Do | Arizona | 5.05 | 4.50 | >90 days. |

It has now been found that the addition of a small amount of a non-phosphatic acid to mixtures of phosphoric acid and molasses effectively prevents gelling during prolonged storage at ambient temperatures. Such non-phosphatic acids include strong mineral acids as sulfuric acid, hydrochloric acid, hydrobromic acid, hydroiodic acid; sulfonic acids, e.g., chlorosulfonic acid, methanesulfonic acid, benzenesulfonic acid, dodecylbenzenesulfonic acid, and the like; weaker acids, e.g., acetic acid, tartaric acid, citric acid, and so on. Prime requirements of the acids operable in this process are that they do not contain the phosphate anion and that they are non-toxic to the animals being fed at the concentration required to stabilize the selected molasses against gelling. Sulfuric acid is particularly preferred since it is highly effective when used in small portions and does not introduce constituents which are deleterious to the feed value of the liquid supplement.

The non-phosphatic acid can be added to either the phosphatic component or to the molasses component prior to the blending of these components, or it can be added after the blending. If strong mineral acids are used and added to the molasses, it is preferred that they be diluted prior to contacting the molasses to avoid possible charring of the molasses. Generally it is preferred to add the acid to the phosphatic solution prior to its contact with the molasses. In any case, the addition and mixing-in of the acid can be accomplished effectively by means well known to the art.

The process of this invention can also be employed to fluidize gels which have inadvertently formed in storage or handling equipment. Such gels are fluidized by stirring in the required amount of non-phosphatic acid, generally as an aqueous solution or as part of the succeeding batch of liquid feed.

The process of this invention is applicable to liquid animal feeds wherein mixtures of phosphoric acid and/or soluble phosphates and molasses are present. Such soluble phosphates include ammonium phosphates, sodium phosphates, monocalcium phosphates, potassium phosphates, polyphosphates, and the like. The molasses include those commonly known to the art as feed grade molasses, such as by-products obtained in the production of cane sugar, beet sugar, corn sugar, citrus juice, and the like.

Although it is generally possible to prepare solutions of molasses and phosphoric acid or soluble phosphates in any desired ratio, such ratios are generally limited by the particular use to which the liquid feed supplement is intended. The weight of phosphoric acid or its equivalent of soluble phosphates commonly varies from about 1 to 15 parts by weight per 100 parts by weight of molasses. Smaller amounts of phosphoric acid generally do not supply the desired quantity of phosphorus whereas larger amounts tend to make the liquid feed supplement unpalatable and somewhat corrosive to commonly used equipment. Preferred weights of phosphoric acid or equivalent soluble phosphates vary from about 2 to 10 parts by weight per 100 parts of molasses.

The process of this invention may be applied to animal feed solutions containing only phosphoric acid and molasses as well as to animal feed solutions containing in addition, numerous other soluble ingredients. For example, this invention is particularly effective in alleviating the gelling tendencies of a liquid feed supplement for ruminants containing about 1 to 12 parts by weight of ethanol per 10 parts by weight of urea per ½ to 5 parts by weight of phosphoric acid per about 70 to 175 parts by molasses, vitamin A, and a number of soluble mineral salts. This liquid feed supplement is described in U.S. Patent No. 2,808,332. The components of this feed, other than molasses, are generally prepared centrally as a pre-mix and then shipped to mixer-distributors who secure molasses locally, blend it with the pre-mix, and supply the finished product to livestock feeders. Addition of the non-phosphatic acids of this invention during manufacture of the pre-mix greatly alleviates the problem of gel formation in the finished feed which can so readily occur where molasses from so many widely varying local sources are used.

The quantity of sulfuric acid or other non-phosphatic acid which must be incorporated into any particular phosphatic liquid feed which contains molasses to prevent gelling to a sufficient degree may be determined by a simple gelling test, such as that already described. A small scale test blend, representative of the final liquid feed product, is prepared and treated separately with successively higher amounts of the non-phosphatic acid until gelling during subsequent storage is effectively prevented. With respect to the aforementioned liquid feed supplement described in U.S. 2,808,332, it has been found that a blend of the aforedescribed phosphatic gelling test solution, wherein all active ingredients other than the phosphatic components are excluded, with the molasses, provides a realistic, but accelerated gelling test. At a temperature of 108° F., gelling in the test blend within about two hours corresponds to gelling in a commercial sample made from the same molasses, stored at 108° F., within about one to three days; gelling in the test blend occurring between two and twenty-four hours corresponds to gelling in the commercial sample occurring in the three to six week range. Finally, where no gelling occurs within twenty-four hours in the test blend, the corresponding commercial sample resists gelling for over six weeks, these periods being of sufficient duration for the general use pattern of the product.

Generally, the use of up to about 12 parts by weight of concentrated sulfuric acid per 100 parts by weight of 75% phosphoric acid or its equivalent will prevent gelling in liquid feeds containing any particular feed grade molasses; preferably, from about 5 to 9 parts of concentrated sulfuric acid is used. With the liquid feed supplement described in column 3, lines 62–70, the incorporation of about 0.025 to 0.45 parts by weight of sulfuric acid is effective for preventing gel formation. Quantities of hydrochloric acid supplying the equivalent acidity as the sulfuric acid are generally effective, but less satisfactory from the standpoint of the usually less desirable chlorides introduced. The weaker non-phosphatic acids, e.g., acetic, tartaric, citric, and the like, are effective for use with molasses which exhibit moderate gelling tendencies, but are less preferred than sulfuric acid, particularly for use with the higher gelling molasses, due to the correspondingly greater quantities required to provide the equivalent acidity, and the relatively higher cost of such acids.

The following examples are presented to illustrate the invention without limitation. All parts are by weight unless otherwise indicated.

EXAMPLE I

Part A 20 parts of a commercial feeding blackstrap Mexican molasses obtained from the Maryland supply area and exhibiting a pH of 5.09 was blended uniformly with 10 parts of the phosphatic gelling test solution aforedescribed and varying amounts of 95–98% sulfuric acid, and placed in stoppered glass vials. These vials were stored in a water bath at 42° C. for periods exceeding 50 days and the gelling behavior noted as follows:

| $H_2SO_4$, parts per 100 parts 75% $H_3PO_4$ | pH of Blend | Gelling Behavior |
|---|---|---|
| 0 | 4.54 | Gelled solid within 1.5 hours. |
| 4.4 | 4.38 | Partially gelled within 4.5 hours Gel easily broken to a fluid. |
| 6.7 | 4.34 | Fluid with only a trace of gel after 50 days. |
| 8.9 | 4.31 | Fluid after 50 days. |

Part B

To determine the effect on gelling of varying the ratio of phosphoric acid to molasses, the amount of phosphate anion was varied from that of the gelling test solution of Part A, and the same gelling tests performed using a Hawaiian feed molasses. In each test, the pH of the blend was adjusted to 4.35 with hydrochloric acid. The following results were obtained.

| $H_3PO_4$, % of $H_3PO_4$ in gelling test solution | pH of Blend Initial | pH of Blend Adjusted | Gelling Behavior |
|---|---|---|---|
| 25 | 5.30 | 4.35 | No gel at end of 75 days. |
| 50 | 5.15 | 4.35 | 5% gel at end of 75 days. |
| 100 | 4.95 | 4.35 | Gelled within 3 days. |
| 200 | 4.35 | 4.35 | Gelled within 10 minutes. |
| 400 | 4.35 | 4.35 | Gelled within 7 minutes. |

It is apparent from this experiment that increasing ratios of phosphoric acid to molasses tend to increase the gelling tendencies of a gelling type molasses, in spite of the fact that the pH of the blend is appreciably lower than that of the molasses.

EXAMPLE II

The procedure of Example I, Part A, was repeated with a commercial feeding blackstrap Mexican molasses obtained from a Texas supply area and exhibiting a pH of 5.56. The gelling behavior was noted as follows:

| $H_2SO_4$, parts per 100 parts 75% $H_3PO_4$ | pH of Blend | Gelling Behavior |
|---|---|---|
| 0 | 4.94 | Gelled solid within 1.5 hours. |
| 4.4 | 4.83 | Mushy within 4.5 hours. |
| 6.7 | 4.75 | Mushy within 21 hours. |
| 8.9 | 4.69 | Fluid with only a trace of gel after 50 days. |

EXAMPLE III

Example I, Part A, was repeated, using in place of the phosphatic gelling test solution, a commercial pre-mix. The pre-mix, having a pH of 2.17, contained phosphoric acid, ethanol, urea, water, aluminum chloride, magnesium sulfate, and trace minerals such as the chlorides of cobalt, copper, manganese, zinc, iron, as well as vitamin $D_2$ and artificial colorants. The sulfuric acid was dissolved in the pre-mix prior to blending with the molasses. Gelling behavior was noted as follows:

| $H_2SO_4$, parts per 100 parts 75% $H_3PO_4$ | pH of Blend | Gelling Behavior |
|---|---|---|
| 0 | 3.83 | Fluid, but with about 10% soft gel after 50 days. |
| 4.4 | 3.72 | Fluid after 50 days. |
| 6.7 | 3.70 | Do. |
| 8.9 | 3.55 | Do. |

EXAMPLE IV

Example III was repeated with the molasses of Example II. Results were as follows:

| $H_2SO_4$, parts per 100 parts 75% $H_3PO_4$ | pH of Blend | Gelling Behavior |
|---|---|---|
| 0 | 4.30 | Gelled solid within 18 hours. |
| 4.4 | 4.21 | Mushy within 18 hours; gelled solid within 3 days. |
| 6.7 | 4.20 | Fluid after 50 days. |
| 8.9 | 4.16 | Do. |

EXAMPLE V

Example I, Part A, was repeated with the following changes: (a) the molasses was feed blackstrap Mexican molasses obtained from a Pennsylvania supply area, exhibiting a pH of 4.98, and (b) the sulfuric acid was blended in the form of a 1:1 solution by weight with distilled water with the molasses prior to the blending of the molasses with the phosphatic gelling test solution. The following results were noted:

| Parts $H_2SO_4$ per 100 parts molasses | Parts $H_2SO_4$ per 100 parts 75% $H_3PO_4$ | pH of Blend | Gelling Behavior |
|---|---|---|---|
| 0 | 0 | 4.48 | Gelled within 75 minutes. |
| 0.1 | 2.2 | 4.39 | Gelled within 3 hours. |
| 0.2 | 4.4 | 4.34 | Fluid after 55 days. |
| 0.3 | 6.6 | 4.30 | Do. |
| 0.4 | 8.8 | 4.19 | Do. |

EXAMPLE VI

The procedure of Example III was repeated using as the molasses a feed blackstrap molasses having a pH of 5.08 and as the non-phosphatic acid, concentrated hydrochloric acid. Gelling behavior was recorded as follows:

| 37% HCl, parts per 100 parts 75% $H_3PO_4$ | pH of Blend | Gelling Behavior |
|---|---|---|
| 0 | 3.52 | ½ gelled within 70 days. |
| 29.6 | 3.52 | Fluid with no gel after 105 days. |
| 59.2 | 2.47 | Do. |

EXAMPLE VII

A commercial sample of a liquid feed supplement, as previously set forth in column 3, lines 62–70, containing phosphates and molasses was obtained. As received, the sample exhibited a pH of 4.34 and was completely gelled. By means of vigorous agitation, the gel could be broken and the product fluidized, however, the material regelled in less than 24 hours at 108° F. 8 parts of vinegar (11.5% acetic acid) was blended uniformly with 30 parts of the gelled product and the blend fluidized. This blend, exhibiting a pH of 4.0, remained fluid and free from gelling during storage at 108° F. for over 62 days.

EXAMPLE VIII

Example III was repeated using as the molasses a feed molasses obtained from an Indiana supply area and as the non-phosphatic acid, citric acid. The following gelling behavior was observed.

| Citric acid, parts per 100 parts 75% H₃PO₄ | Gelling Behavior |
|---|---|
| 0 | Completely gelled within 18 hours. |
| 22 | Fluid and less than 5% gell after 80 days. |

EXAMPLE IX

According to the procedures of Example I, Part A, and Example III, samples of feed molasses of pH of 5.08 were blended with the phosphatic gelling test solution and the commercial pre-mix solution in which tartaric acid had been dissolved. Gelling behavior was noted as follows.

| Phosphatic Solution | Tartaric acid, parts per 100 parts 75% H₃PO₄ | pH of Blend | Gelling Behavior |
|---|---|---|---|
| Gelling test solution | 0 | 4.54 | Gelled within 2 hours. |
| Gelling test solution | 11.1 | 4.36 | Gelled within 24 hours. |
| Commercial Pre-mix | 0 | 3.80 | 20% gelled within 25 days. |
| Commercial Pre-mix | 11.1 | 3.66 | Fluid with no gelling after 25 days. |

From the aforegoing description and examples, it is apparent that this invention provides an unexpected, novel, and economical solution to a practical and costly problem prevalent in the liquid animal feed industry. Using existing equipment, producers and distributors of liquid phosphatic animal feeds containing molasses can prevent or alleviate the gelling of such feeds during subsequent storage by incorporating relatively minor amounts of the non-phosphatic acids of this invention. By means of this process, a greater degree of stability against gelling can be imparted when using molasses which have only marginal gelling tendencies. Perhaps an even greater advantage of this invention is that it provides a means of overcoming the rapidly increasing gelling problems created by the decreasing proportion of high grade non-gelling molasses available.

While particular embodiments of this invention are shown above, it will be understood that the invention is obviously subject to variations and modifications without departing from its broader aspects.

What is claimed is:

1. A process for preventing gel formation in a liquid animal feed containing a phosphatic material and molasses which comprises incorporating into said feed a minor, gel-inhibiting amount of a non-phosphatic acid, the amount of said phosphatic material ranging from about 1 to 15 parts by weight per 100 parts by weight of molasses.

2. The process of claim 1 wherein said non-phosphatic acid is sulfuric acid in an amount up to about 12 parts by weight per 100 parts by weight of 75% phosphatic material.

3. The process of claim 1 wherein said non-phosphatic acid is hydrochloric acid.

4. The process of claim 1 wherein said non-phosphatic acid is acetic acid.

5. The process of claim 1 wherein said non-phosphatic acid is citric acid.

6. The process of claim 1 wherein said non-phosphatic acid is tartaric acid.

7. A process for preventing gel formation of a liquid animal feed containing a major amount of molasses, minor amounts of a phosphatic material, a non-proteinaceous nitrogen source, ethanol; which comprises incorporating into said animal feed a gel-inhibiting amount of a non-phosphatic acid, the amount of said phosphatic material ranging from about 1 to 15 parts by weight per 100 parts by weight of molasses.

8. The process of claim 7 wherein said non-phosphatic acid is sulfuric acid in an amount up to about 12 parts by weight per 100 parts by weight of 75% phosphatic material.

9. The process of claim 7 wherein said non-phosphatic acid is hydrochloric acid.

10. The process of claim 7 wherein said non-proteinaceous nitrogen source is urea and said phosphatic material is phosphoric acid.

11. The process of claim 7 wherein said feed also contains water, vitamins and minerals.

12. A liquid animal feed composition comprising a major proportion of molasses, a minor proportion of a phosphatic material, and a gel-inhibiting amount of a non-phosphatic acid, the amount of said phosphatic material ranging from about 1 to 15 parts by weight per 100 parts by weight of molasses.

13. The composition of claim 12 wherein said phosphatic material is phosphoric acid.

14. The composition of claim 12 wherein said non-phosphatic acid is sulfuric acid in an amount up to about 12 parts by weight per 100 parts by weight of 75% phosphatic material.

15. The composition of claim 12 wherein said non-phosphatic acid is hydrochloric acid.

16. The composition of claim 12 wherein said animal feed also contains minor amounts of urea and ethanol.

17. A liquid animal feed containing about 70 to 175 parts by weight of molasses, about ½ to 5 parts by weight of phosphoric acid, about 0.025 to 0.45 part by weight of sulfuric acid, about 10 parts by weight of urea and about 1 to 12 parts by weight of ethanol.

References Cited by the Examiner

UNITED STATES PATENTS 2,377,360  6/45  Musher _____ 99—6
2,808,332  10/57  Anderson et al. _____ 99—6 X

OTHER REFERENCES

Kertesz: The Pectic Substances 1951 (page 435), Interscience Publishers, Inc., New York TP 248.P4 K4.

A. LOUIS MONACELL, *Primary Examiner.*

ABRAHAM H. WINKELSTEIN, *Examiner.*